United States Patent
Tanada et al.

(10) Patent No.: US 7,059,122 B2
(45) Date of Patent: Jun. 13, 2006

(54) EXHAUST GAS PURIFICATION APPARATUS FOR ENGINE

(75) Inventors: Hiroshi Tanada, Nagoya (JP); Takaharu Hashimoto, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/650,917

(22) Filed: Aug. 29, 2003

(65) Prior Publication Data

US 2005/0011182 A1 Jan. 20, 2005

(30) Foreign Application Priority Data

Aug. 30, 2002 (JP) ............................. 2002-255657

(51) Int. Cl.
*F01N 3/00* (2006.01)
(52) U.S. Cl. ..................... 60/297; 60/284; 60/285; 60/300; 60/311
(58) Field of Classification Search ................ 60/285, 60/295, 297, 311, 284, 300
See application file for complete search history.

(56) References Cited

U.S. PATENT DOCUMENTS

| | | | |
|---|---|---|---|
| 5,538,697 A * | 7/1996 | Abe et al. ............... 422/171 |
| 5,887,422 A * | 3/1999 | Abe et al. ............... 60/274 |
| 5,939,028 A | 8/1999 | Bennett et al. |
| 6,029,441 A * | 2/2000 | Mizuno et al. ........... 60/274 |
| 6,047,544 A | 4/2000 | Yamamoto et al. |
| 6,185,933 B1 * | 2/2001 | Tsuzuki et al. .......... 60/285 |
| 6,220,018 B1 * | 4/2001 | Yamanashi et al. ...... 60/285 |
| 6,230,489 B1 * | 5/2001 | Tsuzuki et al. .......... 60/299 |
| 6,681,567 B1 * | 1/2004 | Yasui et al. ............. 60/297 |
| 2001/0002538 A1 | 6/2001 | Katsuta et al. |

FOREIGN PATENT DOCUMENTS

| | | |
|---|---|---|
| EP | 0 602 963 A1 | 6/1994 |
| EP | 0 976 916 A2 | 2/2000 |
| FR | 2 686 375 A1 | 7/1993 |

OTHER PUBLICATIONS

Lafyatis, David S., et al. Society of Automative Engineers Technical Paper Document No. 980421. International Congress & Exposition, Feb. 1998, Detroit, MI, USA, Session: Advanced Converter Concepts For Emission Control, pp. 65–70.

* cited by examiner

*Primary Examiner*—Thomas Denion
*Assistant Examiner*—Diem Tran
(74) *Attorney, Agent, or Firm*—Birch, Stewart, Kolasch & Birch, LLP

(57) ABSTRACT

The exhaust gas purification apparatus for an engine comprises, a catalytic converter provided in an exhaust path of the engine and including a carrier, an HC absorbent, an HC purifying catalyst, and a transition metal, and a control apparatus for controlling operation of the engine, the control apparatus including an HC desorption timing estimation section for estimating a timing at which the HC is desorbed from the HC absorbent and a control section for controlling an air fuel ratio upon starting of the engine to a ratio richer than a stoichiometric air fuel ratio to start operation of the engine and changing over the air fuel ratio to a ratio leaner than the stoichiometric air fuel ratio at the timing at which the HC is desorbed based on an output of the HC desorption timing estimation section.

16 Claims, 7 Drawing Sheets

EXHAUST GAS PURIFICATION APPARATUS FOR ENGINE

CROSS REFERENCE TO RELATED APPLICATION

This non-provisional application incorporates by reference the subject matter of Application No. 2002-255657 filed in Japan on Aug. 30, 2002, on which a priority claim is based under 35 U.S.C. § 119 (a).

BACKGROUND OF THE INVENTION

1) Field of the Invention

This invention relates to an apparatus for purifying exhaust gas from an engine, and more particularly to an exhaust gas purification apparatus for purifying HC in exhaust gas upon cold starting of an engine.

2) Description of the Related Art

Exhaust gas purification apparatus for a gasoline engine such as an MPI (Multi Point Injection) engine have been proposed, which oxidize or reduce hazardous substances (carbon monoxide CO, hydrocarbons HC, nitrogen oxides NOx, and so forth) exhausted from the engine, and consequently, change hazardous substances into more harmless substances. In order to particularly reduce, from among the hazardous substances, HC discharged by a large amount upon cold starting of the engine, apparatus have been developed wherein HC is absorbed once into an HC-trap catalyst.

Referring to FIG. 6, an exemplary one of conventional exhaust gas purification apparatus is shown and includes a three way catalyst (TWC) 1 and an HC-trap catalyst 2 with a three way function provided as front catalytic converters (MCC: Manifold Catalytic Converter) at an upstream portion (for example, an exhaust manifold) 31a of an exhaust path 31 of an engine body 30, and another HC-trap catalyst 2 with a three way function provided as an under-floor catalytic converter (UCC) at a downstream portion 31b of the exhaust path 31.

As shown in FIG. 7, the HC-trap catalyst 2 with a three way function includes an HC absorbent 2a (here, zeolite) formed on an inner peripheral face of a carrier 3, in which a plurality of cell holes 3a are formed, for absorbing HC, and a three way catalyst 2b formed on the HC absorbent 2a for purifying HC desorbed from the HC absorbent 2a. In such a conventional exhaust gas purification apparatus as just described, particularly upon cold starting of the engine, a large amount of HC included in exhaust gas exhausted from the engine body (engine) 30 is absorbed once into the HC absorbent 2a, and then, when the temperature of the HC absorbent 2a becomes higher than a predetermined temperature (HC desorption starting temperature) and the HC is desorbed from the HC absorbent 2a, the desorbed HC is purified with the three way catalyst 2b. Meanwhile, the other hazardous substances (CO, NOx) than HC are purified with the three way catalyst 2b and the three way catalyst 1.

Incidentally, when purification of HC is performed, the purification performance upon desorption of HC from the HC absorbent 2a after it is absorbed once by the HC absorbent 2a is a significant factor. However, since the desorption starting temperature of HC is approximately 70 to 150° C. while the temperature (activation lower limit temperature) at which the three way catalyst 2b starts purification is approximately 250 to 350° C., HC desorbed from the HC absorbent 2a is exhausted into the atmospheric air without being purified until after the three way catalyst 2b is activated.

Therefore, according to the conventional exhaust gas purification apparatus, upon starting of the engine 30, it is rendered operative in a lean mode wherein the air fuel ratio is on the leaner side with respect to the stoichiometric air fuel ratio to burn unburned components in the exhaust path 31 or in the proximity of the catalysts to promote the rise of the temperature of the catalysts or the ignition timing of the engine is delayed to raise the temperature of the exhaust gas to promote the rise of the temperature of the catalysts, and the HC absorbent 2a and the three way catalyst 2b are integrated as in the HC-trap catalyst 2 with a three way function described above to reduce a delay of the rise of the temperature of the three way catalyst 2b. In this instance, however, when the temperature of the three way catalyst 2b rises, also the temperature of the HC absorbent 2a rises simultaneously, and consequently, also starting of desorption of HC is accelerated. After all, there is the limitation to the improvement in the purification performance for HC.

Further, in the conventional exhaust gas purification apparatus, the HC-trap catalyst 2 with a three way function is disposed in the MCC 10 on the most upstream side of the exhaust path 31 in order to accelerate the activation of the three way catalyst 2b of the HC-trap catalyst 2 with a three way function. However, at this position of the MCC 10, exhaust gas which remains in a high temperature state flows into the MCC 10. Therefore, the speed of the temperature rise of the catalysts becomes high and also the temperature of the catalysts becomes high. However, since the HC absorbent 2a generally has a low heat resistant temperature, the durability of the HC-trap catalyst 2 with a three way function is degraded. Further, it is a possible idea to lower the maximum temperature of the engine so as not to raise the temperature of the exhaust gas in order to assure the durability. This, however, gives rise to degradation of the output power performance of the engine or deterioration of the fuel cost by utilization of cooling of the fuel. Furthermore, since the provision itself of the MCC 10 raises the temperature or the pressure of the exhaust gas of the engine, it gives rise to degradation of the output power performance of the engine and promotion of the thermal degradation of the catalytic performance.

SUMMARY OF THE INVENTION

The present invention provides an exhaust gas purification apparatus which can efficiently purify HC in exhaust gas of an engine upon cold starting of the engine.

According to the present invention, there is provided an exhaust gas purification apparatus for an engine, comprising, a catalytic converter provided in an exhausted path of said engine and including a carrier, an HC absorbent carried on the carrier for absorbing HC in exhaust gas of the engine, an HC purifying catalyst carried on the carrier and capable of purifying the HC desorbed from the HC absorbent, and a transition metal carried on the carrier for absorbing CO in the exhaust gas, and a control apparatus for controlling operation of the engine, the control apparatus including HC desorption timing estimation means for estimating a timing at which the HC is desorbed from the HC absorbent and control means for controlling an air fuel ratio upon starting of the engine to a ratio richer than a stoichiometric air fuel ratio to start operation of the engine and changing over the air fuel ratio to a ratio leaner than the stoichiometric air fuel ratio at the timing at which the HC is desorbed based on an output of the HC desorption timing estimation means.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PRESENT INVENTION

The present invention will now be described in detail with reference to the accompanying drawings showing embodiments thereof. It is to be understood, however, that the dimensions, materials, shapes, and arrangements of component parts should not be restricted to the following embodiments, but changes within the purview of the appended claims may be made without departing from the true scope.

Figure 1:
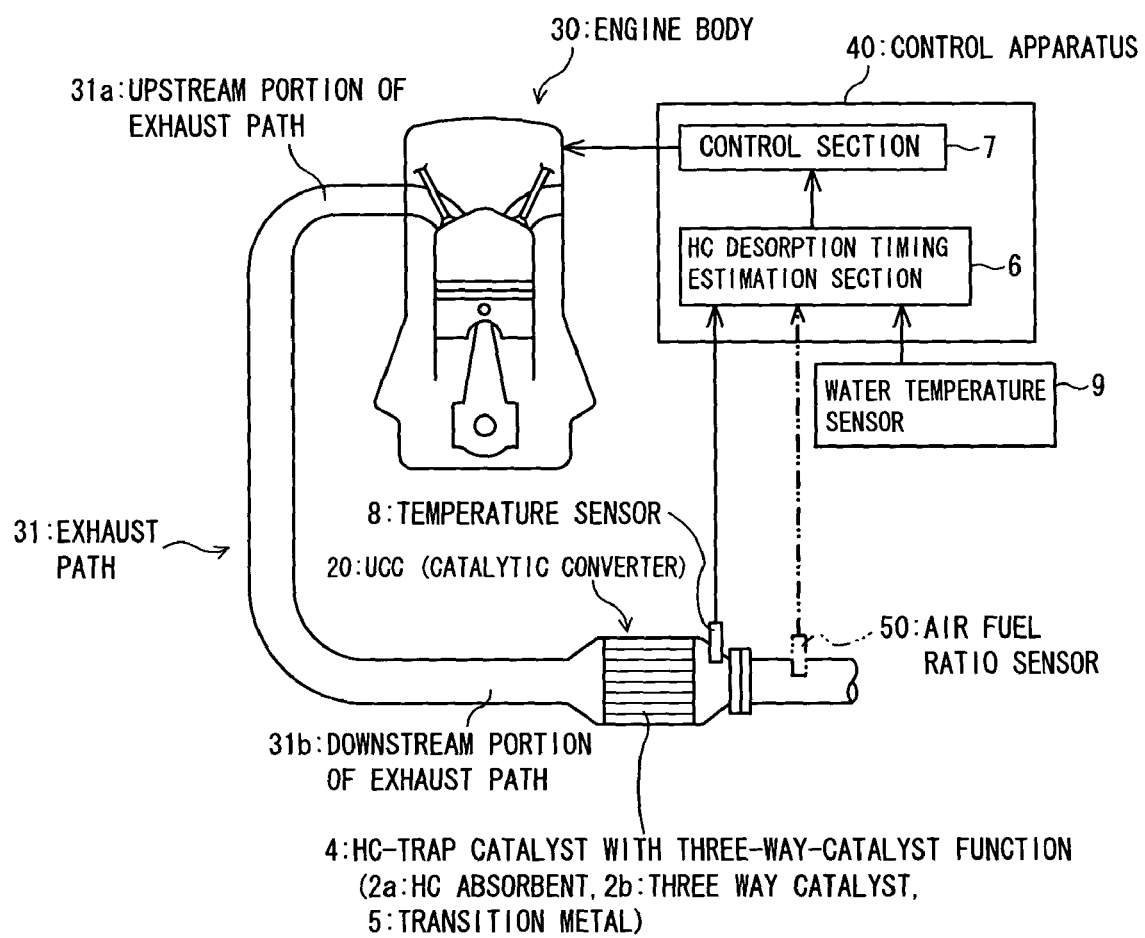
FIG. 1 is a schematic block diagram showing an exhaust gas purification apparatus according to an embodiment of the present invention.
Figure 2:
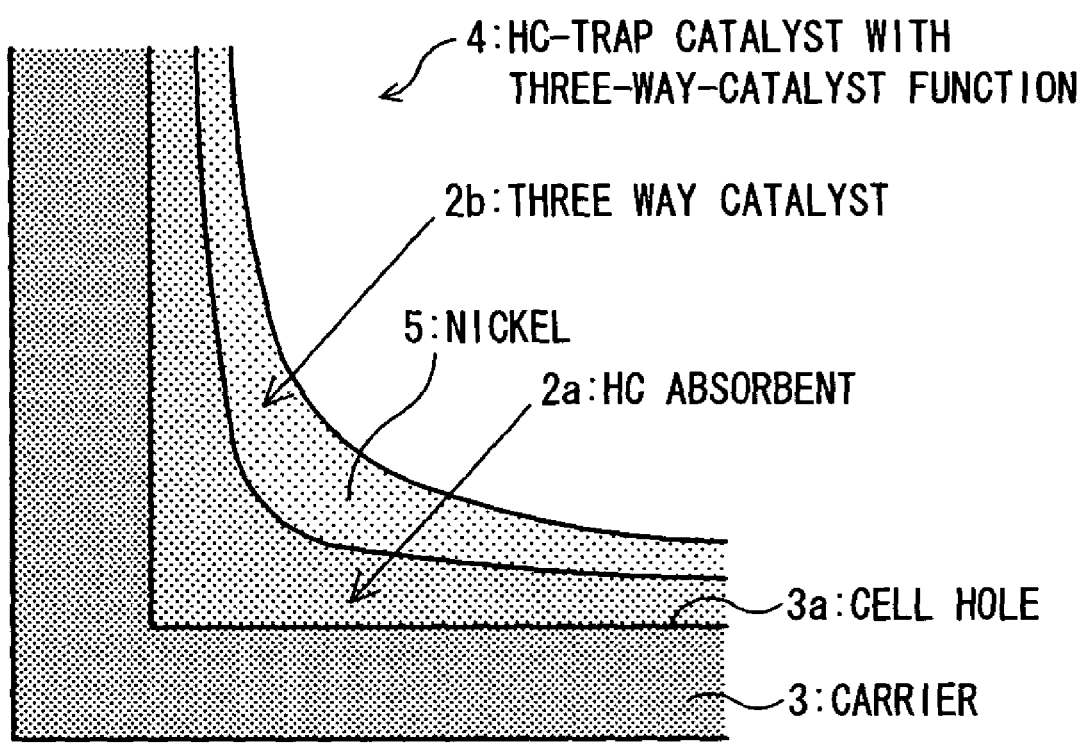
FIG. 2 is a schematic sectional view showing a structure of an HC-trap catalyst with a three way function of the exhaust gas purification apparatus according to the embodiment of the present invention.
Figure 3:
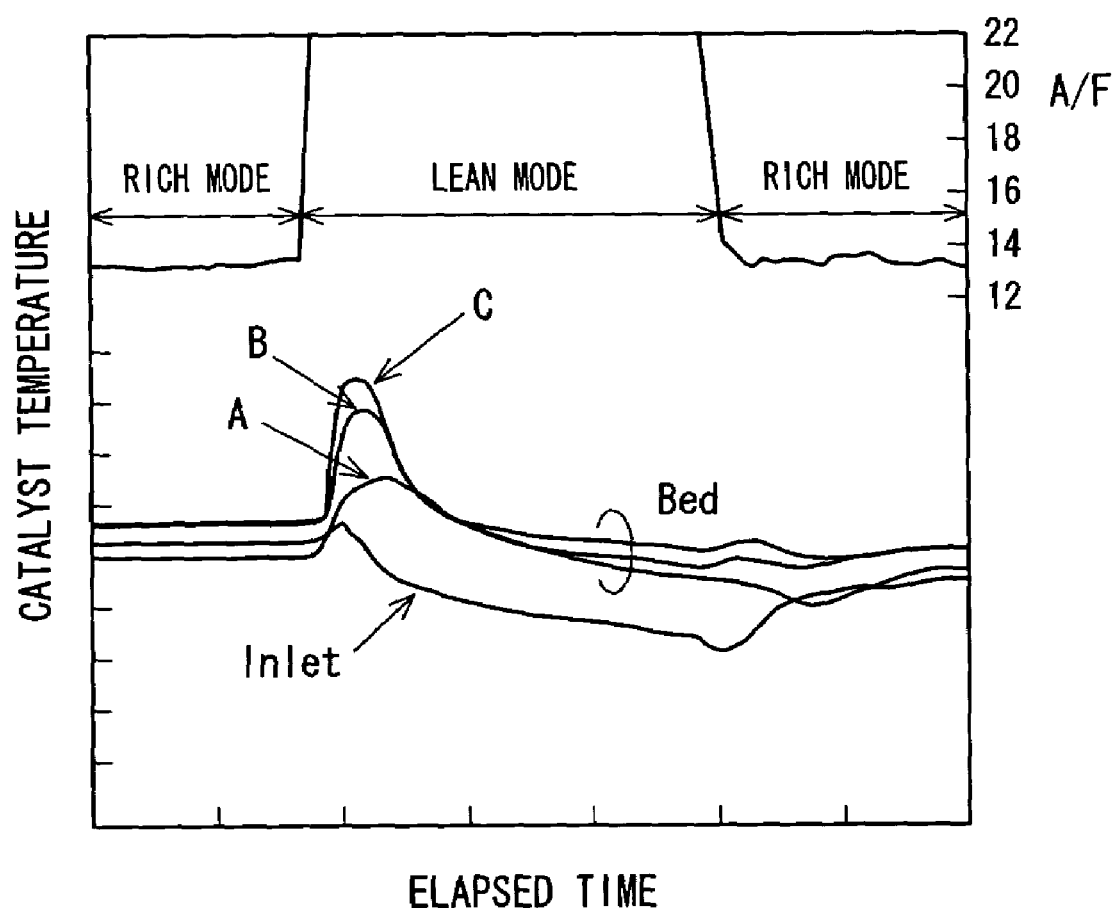
FIG. 3 is a graph illustrating a time variation of the temperature and the A/F of the HC-trap catalyst with a three way function of the exhaust gas purification apparatus according to the embodiment of the present invention.
Figure 4:
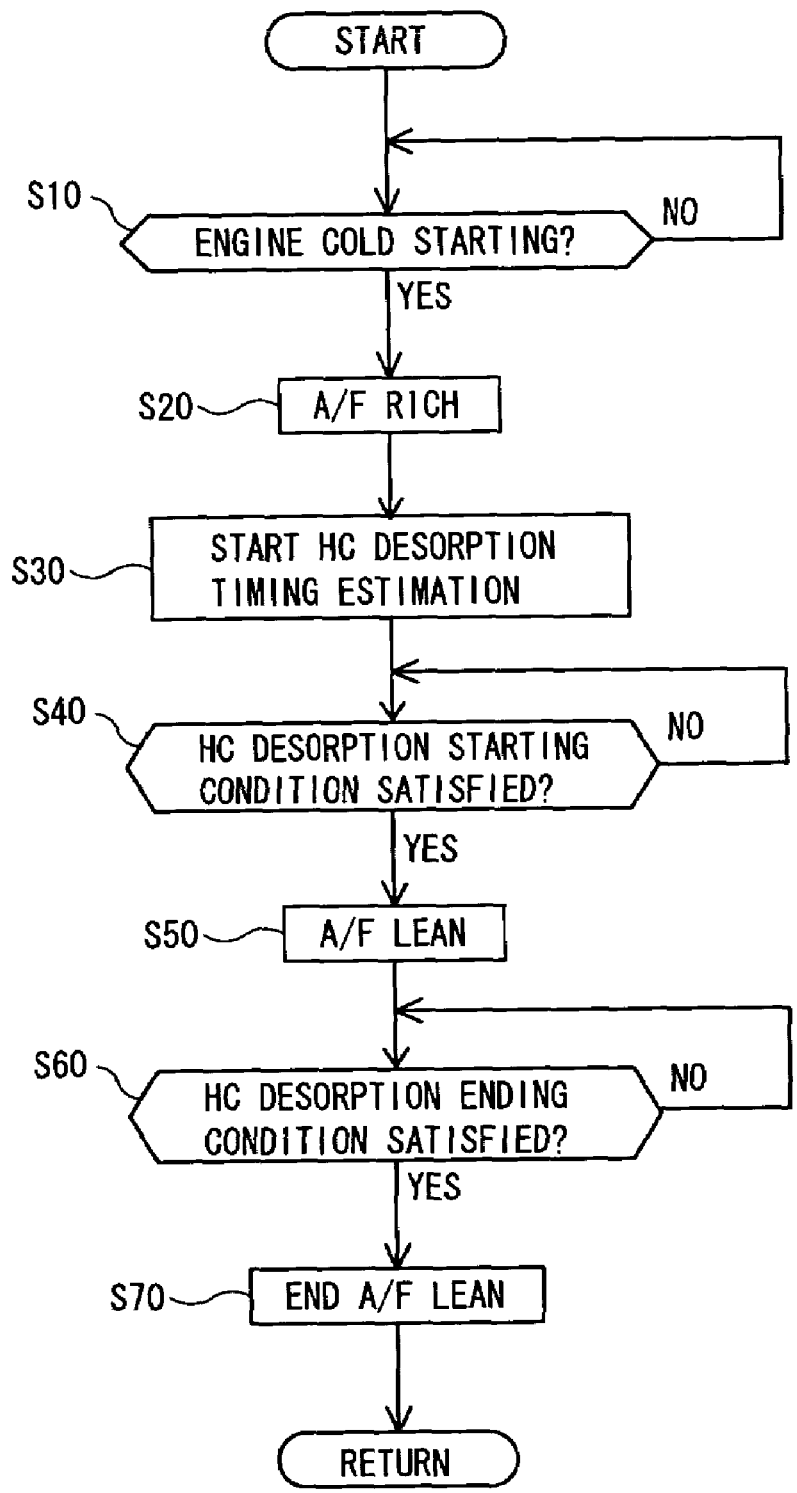
FIG. 4 is a flow chart illustrating combustion mode (A/F) control of the exhaust gas purification apparatus according to the embodiment of the present invention.

FIGS. 1 to 4 show an exhaust gas purification apparatus as an embodiment of the present invention, and FIG. 1 is a schematic block diagram of the exhaust gas purification apparatus; FIG. 2 is a schematic sectional view showing a structure of an HC-trap catalyst with a three way function of the exhaust gas purification apparatus; FIG. 3 is a graph illustrating a time variation of the temperature and the A/F of the HC-trap catalyst with a three way function; and FIG. 4 is a flow chart illustrating an air fuel ratio control of the exhaust gas purification apparatus. It is to be noted that, in FIGS. 1 and 2, like elements to those of the conventional exhaust gas purification apparatus described hereinabove are denoted by like reference characters.

Referring to FIG. 1, the present exhaust gas purification apparatus includes an HC-trap catalyst 4 with a three way function provided as an under-floor catalytic converter (UCC, catalytic converter) 20 at a downstream portion 31b of an exhaust path 31. Referring to FIG. 2, in the HC-trap catalyst 4 with a three way function, an HC absorbent (zeolite) 2a for absorbing hydrocarbons (HC) is carried in a layer on inner circumferential faces of a plurality of cell holes 3a formed in a carrier 3 of the UCC 20, and a three way catalyst (HC purification catalyst) 2b is carried on the surface of the layer of the HC absorbent 2a.

In addition to the configuration described above, nickel (Ni) 5, which is a kind of transition metal, is carried on the three way catalyst 2b. It is to be noted that the transition metal which may be carried on the three way catalyst 2b is not limited to the nickel 5, but cobalt (Co), zinc (Zn), manganese (Mn), iron (Fe), chrome (Cr) and so forth can be used as the transition metal.

Usually, the three way catalyst 2b consists principally of palladium (Pd) or platinum (Pt) although it sometimes contains a very small amount of nickel. In contrast, in the present exhaust gas purification apparatus, a required amount of nickel 5, more particularly of 20 to 30 g/L in the form of NiO, is carried on the three way catalyst 2b. The nickel 5 has a characteristic of absorbing carbon monoxide (CO), and the nickel 5 is carried in the three way catalyst 2b so that a large amount of CO in the exhaust gas can be absorbed. Accordingly, although it is conventionally necessary to use a comparatively large amount of Pd, Pt or the like in order to absorb a large amount of CO, the present apparatus eliminates the necessity but can absorb a large amount of CO by employing nickel 5 which is less expensive than Pd or Pt. The reason why the nickel 5 is used to absorb CO is that it is intended to oxidize (burn) CO to obtain combustion energy and use the combustion energy to heat up the three way catalyst 2b.

The present exhaust gas purification apparatus includes, in addition to the configuration described above, a control apparatus 40 including an HC desorption timing estimation section 6 for estimating a timing at which HC is desorbed from the HC absorbent 2a and a control section 7 for controlling the operation (particularly the air fuel ratio) of the engine 30 as shown in FIG. 1. The control section 7 changes over the air fuel ratio from a rich value to a lean value in accordance with the HC desorption timing.

In particular, upon starting of the engine 30, the air fuel ratio is first controlled to a rich mode wherein it has a richer value than the stoichiometric air fuel ratio so that the engine 30 operates in a state wherein the amount of oxygen ($O_2$) is comparatively small. Consequently, CO generated by the engine 30 is absorbed sufficiently into the nickel 5. Then, at a timing at which HC is desorbed from the HC absorbent 2a as a result of heat-up of the HC-trap catalyst 4 with a three way function, the air fuel ratio is changed over from the rich mode to a lean mode wherein it has a leaner value than the stoichiometric air fuel ratio so that a large amount of $O_2$ is introduced into the HC-trap catalyst 4 with a three way function. Consequently, CO absorbed in the nickel 5 reacts with (oxidizes) the sufficient amount of $O_2$ to form $CO_2$, and therefore, CO is purified at once. Then, the HC-trap catalyst 4 with a three way function is heated up rapidly by the heat of reaction generated at this time.

For example, FIG. 3 illustrates a variation of the air fuel ratio with respect to the catalyst temperature after completion of warming up. It can be seen from FIG. 3 that, when the air fuel ratio is changed over from the rich mode (mode in which the A/F is lower than the stoichiometric air fuel ratio) to the lean mode (mode in which the A/F is higher than the stoichiometric air fuel ratio), the temperature of the exhaust gas drops, and consequently, also the Inlet temperature (temperature at the entrance of the HC-trap catalyst 4 with a three way function) drops whereas the Bed temperature (temperature in the proximity of the surface of the three way catalyst 2b of the HC-trap catalyst 4 with a three way function) rises suddenly at an initial stage.

It is to be noted that lines A, B, and C in FIG. 3 illustrate the temperature variations when the nickel 5 of 10 g/L, 20 g/L and 30 g/L in the form of NiO is carried on the three way catalyst 2b. From this graph, it can be said that, preferably, in order to heat up the HC-trap catalyst 4 with a three way function rapidly, the nickel 5 of approximately 20 g/L to 30 g/L in the form of NiO is carried on the three way catalyst 2b.

In this manner, if the combustion mode is changed over to the lean mode at a timing at which HC is desorbed from the HC absorbent 2a, then the three way catalyst 2b of the HC-trap catalyst 4 with a three way function can be heated up and activated rapidly, and HC desorbed from the HC absorbent 2a can be purified efficiently with the three way catalyst 2b. Incidentally, the HC desorption timing estimation section 6 estimates the desorption timing of HC based on an output of a temperature sensor (high temperature sensor) 8 serving as a temperature detection element for directly detecting the temperature of the HC absorbent 2a or a temperature corresponding to the temperature of the HC absorbent 2a.

It is to be noted that, while, in the present embodiment, the temperature of the HC absorbent 2a is detected directly by means of the temperature sensor 8, it is otherwise possible to detect the temperature of the exhaust path 31 and estimate the temperature of the HC absorbent 2a from the detected temperature information. Also it is possible to arithmetically operate the temperature of the HC absorbent 2a from the elapsed time after starting of the engine 30 or the total fuel injection amount after starting of the engine 30 and estimate the desorption timing based on a result of the arithmetic operation. It is to be noted that, in this instance, it is possible to provide a water temperature sensor 9 serving as a water temperature detection element for detecting the temperature of cooling water of the engine 30, perform the arithmetic operation described above additionally based on the temperature information from the water temperature sensor 9, and estimate the desorption timing by means of the HC desorption timing estimation section 6.

The HC desorption timing estimation section 6 further estimates the timing at which the desorption of HC from the HC absorbent 2a is completed based on the temperature information from the temperature sensor 8. It is to be noted that the HC desorption timing in the present embodiment signifies a timing at which HC is predicted to be desorbed. However, the HC desorption timing may otherwise be a timing prior by a predetermined period of time to a timing at which HC is predicted to be desorbed. This allows the three way catalyst 2b to be activated earlier than a timing at which HC is desorbed from the HC absorbent 2a, and consequently, HC can be purified efficiently.

The control section 7 controls the combustion mode to the rich mode upon starting of the engine 30 and then changes, when starting of desorption of HC from the HC absorbent 2a is estimated by the HC desorption timing estimation section 6, the combustion mode of the engine 30 from the rich mode to the lean mode. Further, if a desorption completion timing of HC from the HC absorbent 2a is estimated by the HC desorption timing estimation section 6, then the control section 7 ends the lean mode as the combustion mode of the engine 30 based on the result of estimation and establishes a normal operation mode.

Since the exhaust gas purification apparatus as an embodiment of the present invention has such a configuration as described above, the control of the air fuel ratio upon starting of the engine 30 is performed in the following manner. In particular, referring to FIG. 4, the control section 7 first discriminates at step S10 whether or not starting of the engine 30 is cold starting. If the determination is YES, then the control section 7 sets the combustion mode to the rich mode at step S20 and starts combustion of the engine 30. It is to be noted that the determination of whether or not starting of the engine 30 is cold starting may be performed in the following manner. In particular, for example, the temperature of cooling water of the engine 30 is detected by means of the water temperature sensor 9. When the key switch of the engine 30 is changed over from an off state to an on state, if the detected value of the water temperature is lower than a predetermined value, then it can be determined that starting of the engine 30 is cold starting.

Then at step S30, the HC desorption timing estimation section 6 estimates the desorption timing of HC, and at step S40, it is determined whether or not an HC desorption starting condition is satisfied. If the determination at step S40 is YES, then the combustion mode is changed over from the rich mode to the lean mode at step S50. It is to be noted that the HC desorption starting condition here is given as a temperature of the HC absorbent 2a. However, it may otherwise be given as an elapsed period of time after starting of the engine 30 or a total fuel injection amount as described hereinabove.

Then at step S60, it is determined whether or not an HC desorption ending condition is satisfied. If the determination is YES, then the lean mode as the combustion mode is ended and an ordinary operation mode is established at step S70. It is to be noted that the HC desorption ending condition here is given as a temperature of the HC absorbent 2a similarly to the HC desorption starting condition described above. However, it may otherwise be given as an elapsed period of time after starting of the engine 30 or a total fuel injection amount as described hereinabove.

As described above, according to the present exhaust gas purification apparatus, the three way catalyst 2b can be heated up rapidly in conformity with the HC desorption timing. Therefore, HC desorbed from the HC absorbent 2a can be purified efficiently with the three way catalyst 2b. Further, since lean control is not required immediately after starting of the engine 30, stabilization upon starting of the engine 30 in a cold state can be improved.

Further, where the nickel 5 is carried in the three way catalyst 2b, there is an advantage that the three way catalyst 2b can be heated up earlier than the HC absorbent 2a, and HC desorbed from the HC absorbent 2a can be purified further efficiently. Furthermore, where the nickel 5 is carried in the three way catalyst 2b, the amount of Pd or Pt which is comparatively expensive can be reduced, and consequently, the production cost can be reduced.

Furthermore, even if the HC-trap catalyst 4 with a three way function is installed in the UCC 20, since the three way catalyst 2b can be heated up rapidly, the MCC 10 is not required. Accordingly, the heat resisting property and the durability of the HC-trap catalyst 4 with a three way function can be improved and the production cost thereof can be reduced. Further, since the pressure of the exhaust gas of the engine 30 can be lowered, the output power performance of the engine 30 can be improved.

Figure 5A:
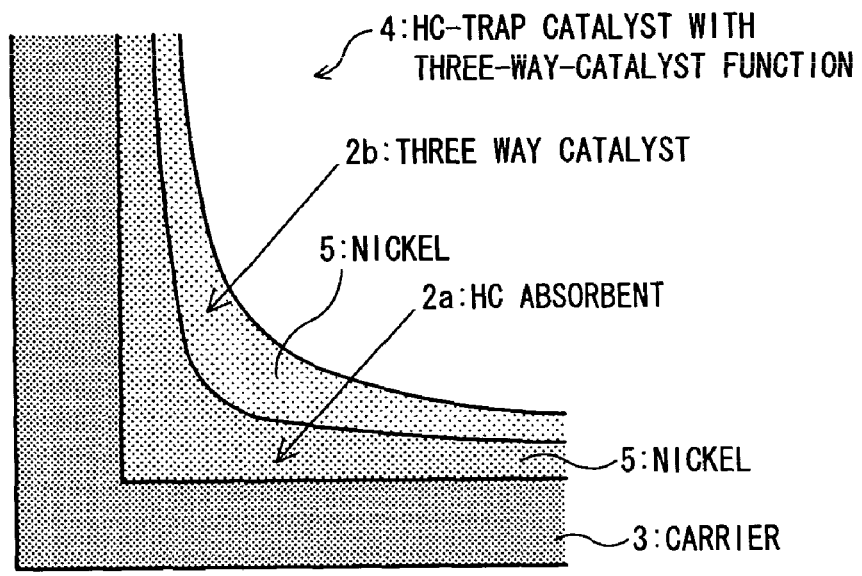
FIG. 5(a) is a schematic sectional view showing modifications to the exhaust gas purification apparatus according to the embodiment of the present invention and a catalyst structure where a transition metal is carried on an HC absorbent and an HC purification catalyst.
Figure 5B:
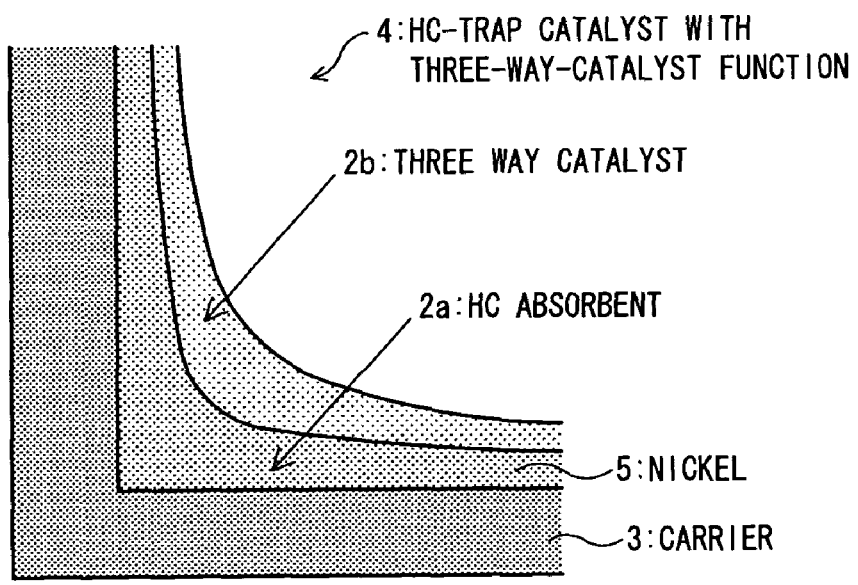
FIG. 5(b) is a schematic sectional view showing modifications to the exhaust gas purification apparatus according to the embodiment of the present invention and a catalyst structure where a transition metal is carried only on an HC absorbent.
Figure 6:
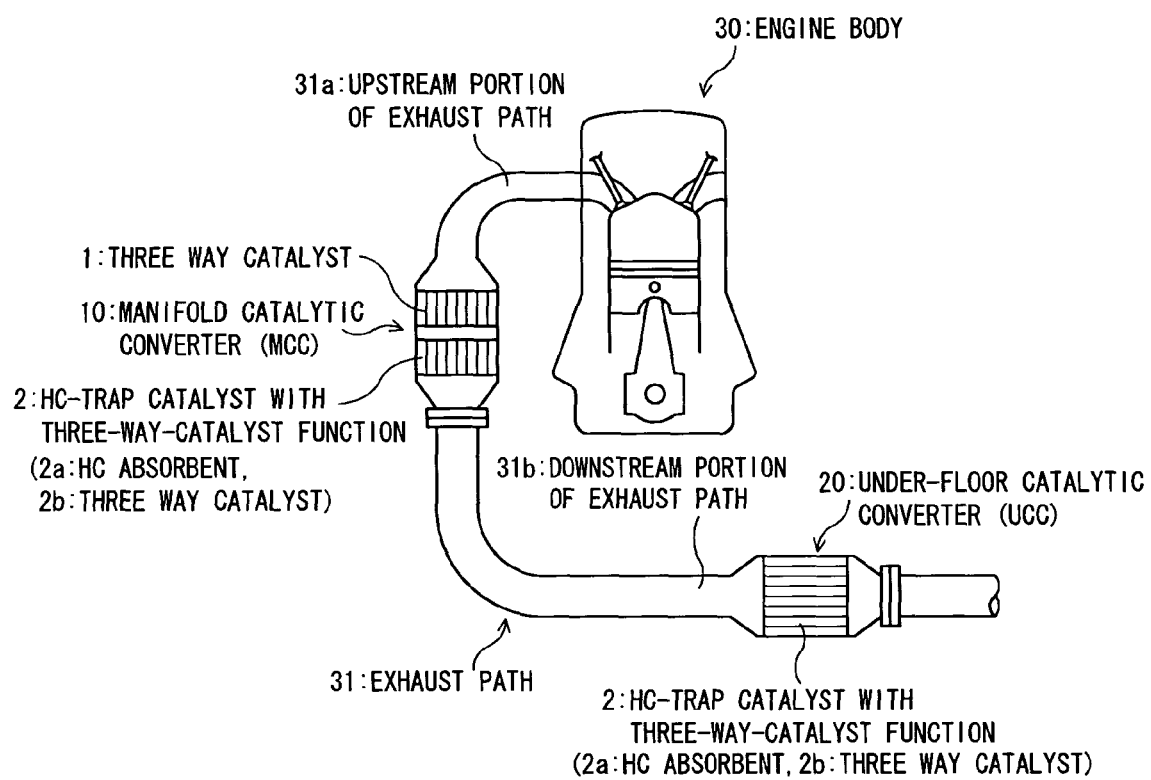
FIG. 6 is a schematic view showing a configuration of a conventional exhaust gas purification apparatus.
Figure 7:
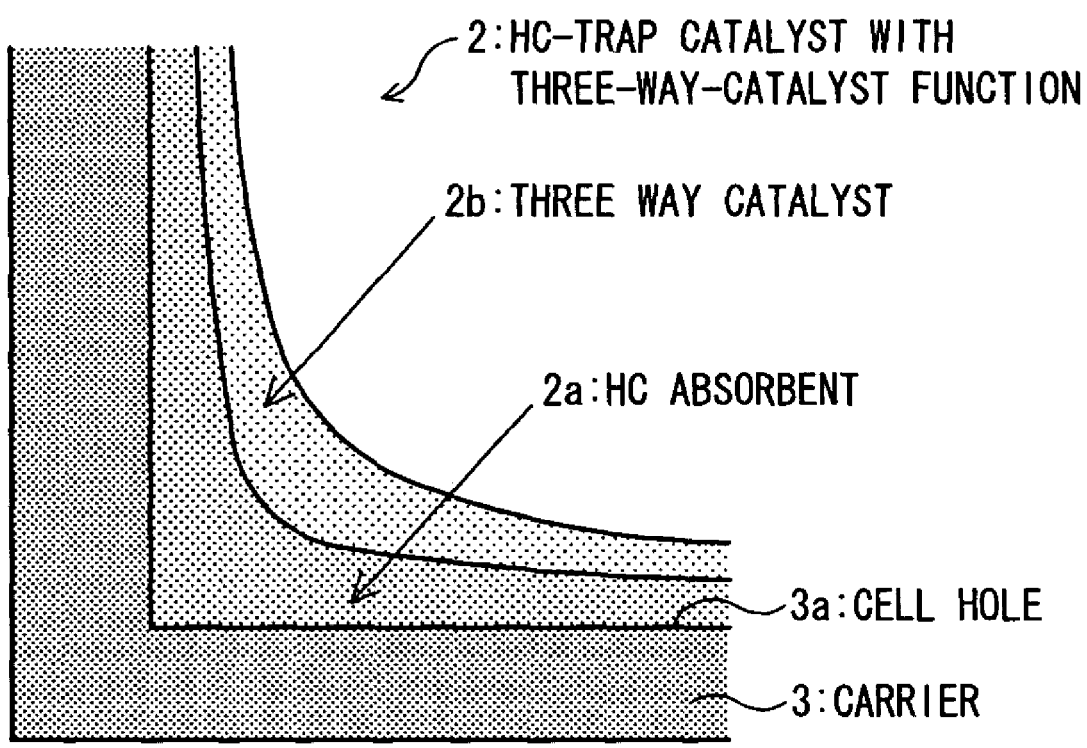
FIG. 7 is a schematic sectional view showing a structure of an HC-trap catalyst with a three way function according to the conventional exhaust gas purification apparatus.

While an embodiment of the present invention has been described, the present invention is not limited to the embodiment described above, but can be carried out in various modified forms without departing from the scope and spirit of the present invention. For example, while, in the present embodiment, the nickel 5 is carried in the three way catalyst 2b, it is otherwise possible to carry the nickel 5 also in the HC absorbent 2a as seen in FIG. 5(*a*) or carry the nickel 5 only in the HC absorbent 2a as seen in FIG. 5(*b*). Similar effects to those of the embodiment described above can be achieved also by the alternative configurations just described.

Further, the temperature information detected by the temperature sensor 8, the elapsed period of time after starting of the engine 30 and the total fuel injection amount after starting of the engine 30 may be used to estimate the HC desorption timing. Where the different kinds of information mentioned are used for arithmetic operation, then the HC desorption timing can be estimated with a higher degree of accuracy.

Further, it is possible to provide an air fuel ratio sensor [for example, a known LAF (Linear Air Fuel Ratio) sensor] 50 at a position downstream of the UCC (catalytic converter) 20 to detect an air fuel ratio and estimate an optimum desorption timing based on the detected information of the air fuel ratio by means the HC desorption timing estimation section 6.

What is claimed is:

1. An exhaust gas purification apparatus for an engine, comprising:
    a catalytic converter provided in an exhaust path of said engine and including a carrier, an HC absorbent provided on said carrier for absorbing HC in exhaust gas of said engine, a three way catalyst, containing a transition metal as a main element for absorbing CO in an exhaust gas, provided on said HC absorbent; and
    a control apparatus for controlling operation of said engine, said control apparatus including HC desorption timing estimation means for estimating a timing at which HC is desorbed from said HC absorbent and control means for controlling an air fuel ratio upon starting of said engine to a ratio richer than a stoichiometric air fuel ratio to start operation of said engine, changing over the air fuel ratio to a ratio leaner than the stoichiometric air fuel ratio at the timing at which the HC is desorbed based on an output of said HC desorption timing estimation means to heat the three way catalyst by making the absorbed CO react with oxygen contained in the exhaust gas, and maintaining the air fuel ratio at the ratio leaner than the stoichiometric air fuel ratio for a period of time determined based on an actual temperature of the HC absorbent.

2. The exhaust gas purification apparatus for an engine as claimed in claim 1, wherein said HC absorbent is carried in a layered state on a surface of said carrier, and said three way catalyst is carried in a layered state on a surface of the layer of said HC absorbent.

3. The exhaust gas purification apparatus for an engine as claimed in claim 1, wherein said transition metal is also contained in the HC absorbent.

4. The exhaust gas purification apparatus for an engine as claimed in claim 1, further comprising:
    temperature detection means for detecting one of a temperature of said HC absorbent and a temperature indicative of the temperature of said HC absorbent,
    wherein, said HC desorption timing estimation means estimates the timing at which the HC is desorbed based on an output of said temperature detection means.

5. The exhaust gas purification apparatus for an engine as claimed in claim 1, wherein said HC absorbent is zeolite.

6. The exhaust gas purification apparatus for an engine as claimed in claim 1, further comprising:
    air fuel ratio detection means for detecting an air fuel ratio after said catalytic converter,
    wherein, said HC desorption timing estimation means estimates the timing at which the HC is desorbed based on an output of said air fuel ratio detection means.

7. The exhaust gas purification apparatus as claimed in claim 1, wherein said transition metal is at least one selected from the group consisting of cobalt (Co), zinc (Zn), manganese (Mn), iron (Fe), and chrome (Cr).

8. The exhaust gas purification apparatus for an engine as claimed in claim 1, wherein said transition metal is nickel.

9. The exhaust gas purification apparatus for an engine as claimed in claim 8, wherein the nickel is contained by approximately 20 to 30 g/L in the form of NiO.

10. The exhaust gas purification apparatus for an engine as claimed in claim 1, wherein said HC desorption timing estimation means estimates the timing at which the HC is desorbed based on an elapsed period of time after the starting of said engine.

11. The exhaust gas purification apparatus for an engine as claimed in claim 10, further comprising:
    water temperature detection means for detecting a temperature of cooling water of said engine,
    wherein said HC desorption timing estimation means estimates the timing at which the HC is desorbed additionally based on temperature information detected by said water temperature detection means.

12. The exhaust gas purification apparatus for an engine as claimed in claim 1, wherein said HC desorption timing estimation means estimates the timing at which the HC is desorbed based on a total fuel injection amount of said engine after the starting of said engine.

13. The exhaust gas purification apparatus for an engine as claimed in claim 12, further comprising:
    water temperature detection means for detecting a temperature of cooling water of said engine,
    wherein said HC desorption timing estimation means estimates the timing at which the HC is desorbed additionally based on temperature information detected by said water temperature detection means.

14. The exhaust gas purification apparatus for an engine as claimed in claim 1, wherein said catalytic converter is provided at a downstream portion of said exhaust path.

15. The exhaust gas purification apparatus for an engine as claimed in claim 14, wherein said engine and said catalytic converter are directly connected to each other without intervention of any other catalytic converter.

16. An exhaust gas purification apparatus for an engine, comprising:
    a catalytic converter provided in an exhaust path of said engine and including a carrier, an HC absorbent provided on said carrier for absorbing HC in exhaust gas of said engine, a three way catalyst, containing a transition metal as a main element for absorbing CO in exhaust gas, provided on said HC absorbent; and
    a control apparatus for controlling operation of said engine, said control apparatus including HC desorption timing estimation means for estimating a timing at which the HC is desorbed from said HC absorbent and control means for controlling an air fuel ratio upon starting of said engine to a ratio richer than a stoichiometric air fuel ratio to start operation of said engine and changing over the air fuel ratio to a ratio leaner than the stoichiometric air fuel ratio at the timing at which HC is desorbed based on an output of said HC desorption timing estimation means to heat said three way catalyst by making the absorbed CO react with oxygen contained in the exhaust gas.

* * * * *